United States Patent
Su et al.

(10) Patent No.: US 12,452,464 B2
(45) Date of Patent: Oct. 21, 2025

(54) FILM GRAIN PARAMETERS ADAPTATION BASED ON VIEWING ENVIRONMENT

(71) Applicant: Dolby Laboratories Licensing Corporation, San Francisco, CA (US)

(72) Inventors: Guan-Ming Su, Fremont, CA (US); Harshad Kadu, Santa Clara, CA (US); Peng Yin, Ithaca, NY (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/721,054

(22) PCT Filed: Dec. 19, 2022

(86) PCT No.: PCT/US2022/053410
§ 371 (c)(1),
(2) Date: Jun. 17, 2024

(87) PCT Pub. No.: WO2023/122039
PCT Pub. Date: Jun. 29, 2023

(65) Prior Publication Data
US 2025/0063203 A1 Feb. 20, 2025

Related U.S. Application Data

(60) Provisional application No. 63/292,654, filed on Dec. 22, 2021.

(30) Foreign Application Priority Data

Jan. 20, 2022 (EP) ..................................... 22152455

(51) Int. Cl.
*H04N 19/80* (2014.01)
*H04N 19/85* (2014.01)

(52) U.S. Cl.
CPC .............. *H04N 19/80* (2014.11); *H04N 19/85* (2014.11)

(58) Field of Classification Search
CPC ............................... H04N 19/80; H04N 19/85
(Continued)

(56) References Cited

U.S. PATENT DOCUMENTS 11,765,372 B1 * 9/2023 Waggoner ............ H04N 19/172
375/240.03
2016/0366444 A1 12/2016 Sullivan

FOREIGN PATENT DOCUMENTS

WO 2021122367 A1 6/2021
WO 2021127628 A1 6/2021

OTHER PUBLICATIONS

Boyce, J., et al., Versatile Supplemental Enhancement Information Messages for Coded Video Bitstreams (Draft 5), MPEG Meeting, Joint Video Experts Team (JVET) of ITU-T SG 16 WP3 and ISO/IEC JTC 1/SC 29/WG 11; 18th Meeting by teleconference, Apr. 15-24, 2020, 85 pages.
(Continued)

*Primary Examiner* — Dave Czekaj

(57) ABSTRACT

Methods, systems, and bitstream syntax are described for metadata signaling and film-grain parameter adaptation based on a viewing environment which may differ from a reference environment. Example adaptation models are provided for viewing parameters that include: ambient room illumination, viewing distance, and pixels per inch in a target display. Example systems include a single reference viewing environment model and a multi-reference viewing environment model supporting adaptation of film-grain model parameters via adaptation functions or interpolation.

11 Claims, 4 Drawing Sheets

(58) Field of Classification Search
USPC .................................................. 375/240.29
See application file for complete search history.

(56) References Cited

OTHER PUBLICATIONS

Flanders Scientific, Inc. (2021). Reference viewing environment. https://flandersscientific.com/tech-resources/ReferenceViewingEnvironment.pdf, 4 pages.

ITU-R BR.2035, A Reference Viewing Environment for Evaluation of HDTV Program Material for Completed Programmes, International Telecommunication Union, Jul. 2013, 9 pages.

ITU-T H.264, Series H: Audiovisual and Multimedia Systems, Advanced Video Coding for Generic Audiovisual Services, Aug. 2021, 844 pages.

ITU-T H.265, Series H: Audiovisual and Multimedia Systems, High Efficiency Video Coding, V9, Sep. 2023, 718 pages.

ITU-T H.266, Series H: Audiovisual and Multimedia Systems, Versatile Video Coding, V3, Sep. 2023, 538 pages.

ITU-T H.274, Series H: Audiovisual and Multimedia Systems, Versatile Supplemental Enhancement Information Messages for Coded Video Bitstreams, Aug. 2020, 86 pages.

Rivaz, P., et al., AV1 Bitstream & Decoding Process Specification, Jan. 2019, https://flandersscientific.com/tech-resources/ReferenceViewingEnvironment.pdf, 681 pages.

SMPTE Registered Disclosure Doc, Film Grain Technology—Specifications for H.264, MPEG-4 AVC Bitstreams, RDD 5:2006, pp. 1-18, Mar. 2006, 10.5594/SMPTE.RDD5.2006, 18 pages.

SMPTE Standard 2080-3:2017, Reference Viewing Environment for Evaluation of HDTV Images, The Society of Motion Picture and Television Engineers, White Plains, NY, Apr. 13, 2017, 10 pages.

Sullivan, G., et al., Ambient Viewing Environment SEI Message, Joint Collaborative Team on Video Coding (JCT-VC) of ITU-T SG 16 WP 3 and ISO/IEC JTC 1/SC 29/WG 11, 21st Meeting, Jun. 19-26, 2015, 4 pages.

* cited by examiner

FILM GRAIN PARAMETERS ADAPTATION BASED ON VIEWING ENVIRONMENT

CROSS-REFERENCE TO RELATED APPLICATIONS

This application is a U.S. National Stage application under U.S.C. 371 of International Application No. PCT/US2022/053410, filed on Dec. 19, 2022, which claims the benefit of priority from EP Application Serial No. 22152455.6, filed on Jan. 20, 2022 and U.S. Provisional Patent Application No. 63/292,654, filed on Dec. 22, 2021, each of which is incorporated by reference in their entirety.

TECHNOLOGY

The present document relates generally to images. More particularly, an embodiment of the present invention relates to the adaptation of film grain parameters for images and video sequences based on a viewing environment.

BACKGROUND

WO 2021/127628 A1 discloses apparatus and methods for providing software and hardware based solutions to the problem of synthesizing noise for a digital image. According to one aspect, a probability image is generated and noise blocks are randomly placed at locations in the probability image where the locations have probability values that are compared to a threshold criterion, creating a synthesized noise image. Features include generating synthesized film grain images and synthesized digital camera noise images.

WO 2021/122367 A1 discloses a decoder that obtains a film grain model syntax element from a parameter set in a coded data representation. The decoder determines a film grain model value by decoding the film grain model syntax element. The decoder decodes a current picture from the coded data representation. The decoder generates an output picture by applying generated film grain to the current picture. The decoder outputs the output picture.

Film grain is typically defined as a random optical texture in processed photographic film due to the presence of small particles of a metallic silver, or dye clouds, developed from silver halide that have received enough photons. In the entertainment industry, and especially in motion pictures, film grain is considered part of the creative process and intent. Thus, while digital cameras do not generate film grain, it is not uncommon for simulated film grain to be added to captured material from digital video cameras to emulate a "film look."

Because of its random nature, film grain poses a challenge to image and video compression algorithms, since a) like random noise, it may reduce the compression efficiency of a coding algorithm used for the coding and distribution of motion pictures, and b) original film grain may be filtered and/or altered due to the lossy compression characteristics of coding algorithms, thus altering the director's creative intent. Thus, it is important when encoding motion pictures to maintain the director's intent on the film-look of a movie, but also maintain coding efficiency during compression.

To handle the film grain more efficiently, coding standards like AVC, HEVC, VVC, AV1, and the like (see Refs. [1-4]) have adopted Film Grain Technology (FGT). FGT in media workflow consists of two major components, film grain modelling and film grain synthesis. At an encoder, film grain is removed from the content, it is modelled according to a film-grain model, and the film grain model parameters are sent in the bitstream as metadata. This part allows for more efficient coding. At a decoder, film grain is simulated according to the model parameters and re-inserted back to the decoded images prior to display, thus preserving creative intent.

The term "metadata" herein relates to any auxiliary information transmitted as part of the coded bitstream and assists a decoder to render a decoded image. Such metadata may include, but are not limited to, color space or gamut information, reference display parameters, and film grain modeling parameters, as those described herein.

Film grain technology is not limited to the content which contains the true film grain. By adding artificial film grain, FGT can also be used to hide compression artifact at a decoder, which is very useful for very low bitrate applications, especially for mobile media.

The primary purpose of FGT is to synthesize film grain to approximate the original film-grain look approved by a colorist under a reference viewing environment. For the end users, the actual viewing environment can be quite different from the reference viewing environment. Experiments by the inventors demonstrate that the viewing environment can change the perception of the film grain. As appreciated by the inventors here, it is desirable to maintain a consistent film grain look across various viewing environments, thus improved techniques for film grain parameter adaptation based on the viewing environment are described herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY OF THE DISCLOSURE

The invention is defined by the independent claims. Dependent claims concern optional features of some embodiments of the invention.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
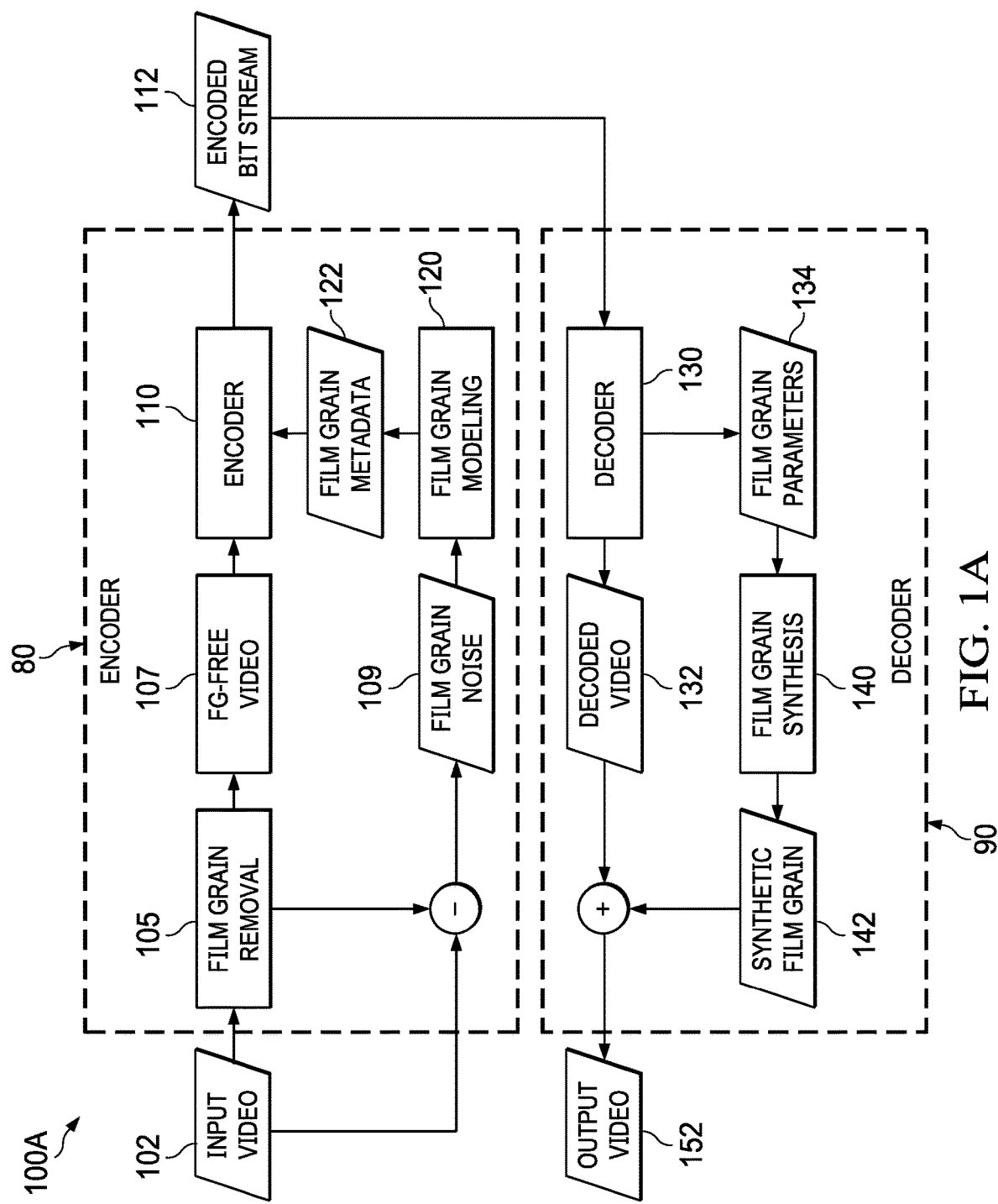
FIG. 1A depicts an example end-to-end flow of film grain technology when film grain may be part of the original input video.

Example embodiments that relate to film-grain parameter adaptation for a viewing environment are described herein.

In the following description, for the purposes of explanation, numerous specific details are set forth in order to provide a thorough understanding of the various embodiments of present invention. It will be apparent, however, that the various embodiments of the present invention may be practiced without these specific details. In other instances, well-known structures and devices are not described in exhaustive detail, in order to avoid unnecessarily occluding, obscuring, or obfuscating embodiments of the present invention.

SUMMARY

Example embodiments described herein relate to film-grain parameter adaptation based on a viewing environment. In an embodiment, a processor receives an input video bitstream and associated input film grain information. The processor:
parses the input film grain information to generate input film grain parameters (301) for generating film noise for a target display;
accesses measured viewing parameters (312) for the target display;
accesses reference viewing parameters for a reference display;
adjusts (315) one or more of the input film grain parameters based on the measured viewing parameters and the reference viewing parameters to generate adjusted film grain parameters;
generates output film noise based at least on the adjusted film grain parameters;
decodes the input video bitstream to generate decoded video pictures; and
blends (320) the output film noise with the decoded video pictures to generate output video pictures on the target display.

In a second embodiment, a processor receives an input video bitstream and two or more sets of associated input film grain information (321), each set corresponding to a distinct target viewing environment, and each set comprising film grain parameters for generating film noise for a target display. The processor:
accesses measured viewing parameters (312) for the target display;
based on the measured viewing parameters, selects (325) from the two or more sets of input film grain information a selected set of input film grain information with parameters closest to the measured viewing parameters;
parses the selected set of input film grain information to generate output film grain parameters for generating film noise for the target display;
generates output film noise based at least on the output film grain parameters;
decodes the input video bitstream to generate decoded video pictures; and
blends (320) the output film noise with the decoded video pictures to generate output video pictures on the target display.

In a third embodiment, a processor receives an input video bitstream and two or more sets of associated input film grain information (331), each set corresponding to a distinct target viewing environment, and each set comprising film grain parameters for generating film noise for a target display. The processor:
accesses measured viewing parameters (312) for the target display;
based on the measured viewing parameters, interpolates (340) parameters from the two or more sets of input film grain information to generate output film grain parameters;
generates output film noise based at least on the output film grain parameters;
decodes the input video bitstream to generate decoded video pictures; and
blends (320) the output film noise with the decoded video pictures to generate output video pictures on the target display.

Film Grain Data Flow Process

In reference to existing coding standards, in AVC, HEVC and VVC (Refs. [1-3] and Ref. [6]) (collectively to be referred to as MPEG or MPEG video standards), film-grain model parameters are carried in a film-grain specific supplemental enhancement information (SEI) message. SEI messaging, including film-grain SEI messaging, is not normative. In SMPTE-RDD-5-2006 (Ref. [5]), the Film Grain Technology Decoder Specification, specifies bit-accurate film grain simulation. In AV1 (Ref. [4]), film-grain model parameters are carried as part of the "Film grain params syntax" section in the bitstream. Unlike the MPEG standards, film grain synthesis in AV1 is normative.

FIG. 1A depicts an example end-to-end flow (100A) of film grain technology when film grain may be part of the original input video. As depicted in FIG. 1A, during the encoding process (80), given an input video sequence (102), a film-grain-removal step (105) analyzes the video and applies denoising or other filtering techniques known in the art to reduce or remove film grain and generate a film-grain-free video (107). Subsequently, the film-grain-free video is encoded by encoder 110 (e.g., using AVC, HEVC, AV1, and the like). In parallel, an estimate of the film grain noise (109) (e.g., as extracted by the input video 102) is processed by film grain modeling process 120 to generate parameters which according to a film-grain model can be used by the decoding process (90) to reproduce a close approximation of the original film grain. These parameters are embedded as metadata (122) in the encoded bitstream (112). The metadata can be part of the bitstream syntax or part of supplemental information (e.g., SEI messaging and the like).

During the decoding process (90), a video decoder (130) (e.g., an AVC, HEVC, AV1, and the like decoder) receives the coded bitstream (112) and the corresponding film-grain metadata (122), to generate a decoded video bitstream (132) and FG parameters (134), typically the same as the parameters generated in step 120 in the encoding process. A film-grain synthesis process 140 applies those FG parameters to generate synthetic film grain (142), which, when added to the decoded video film-grain-free video (132), generates the output video (152), which is a close approximation of the input video (102).

Figure 1B:
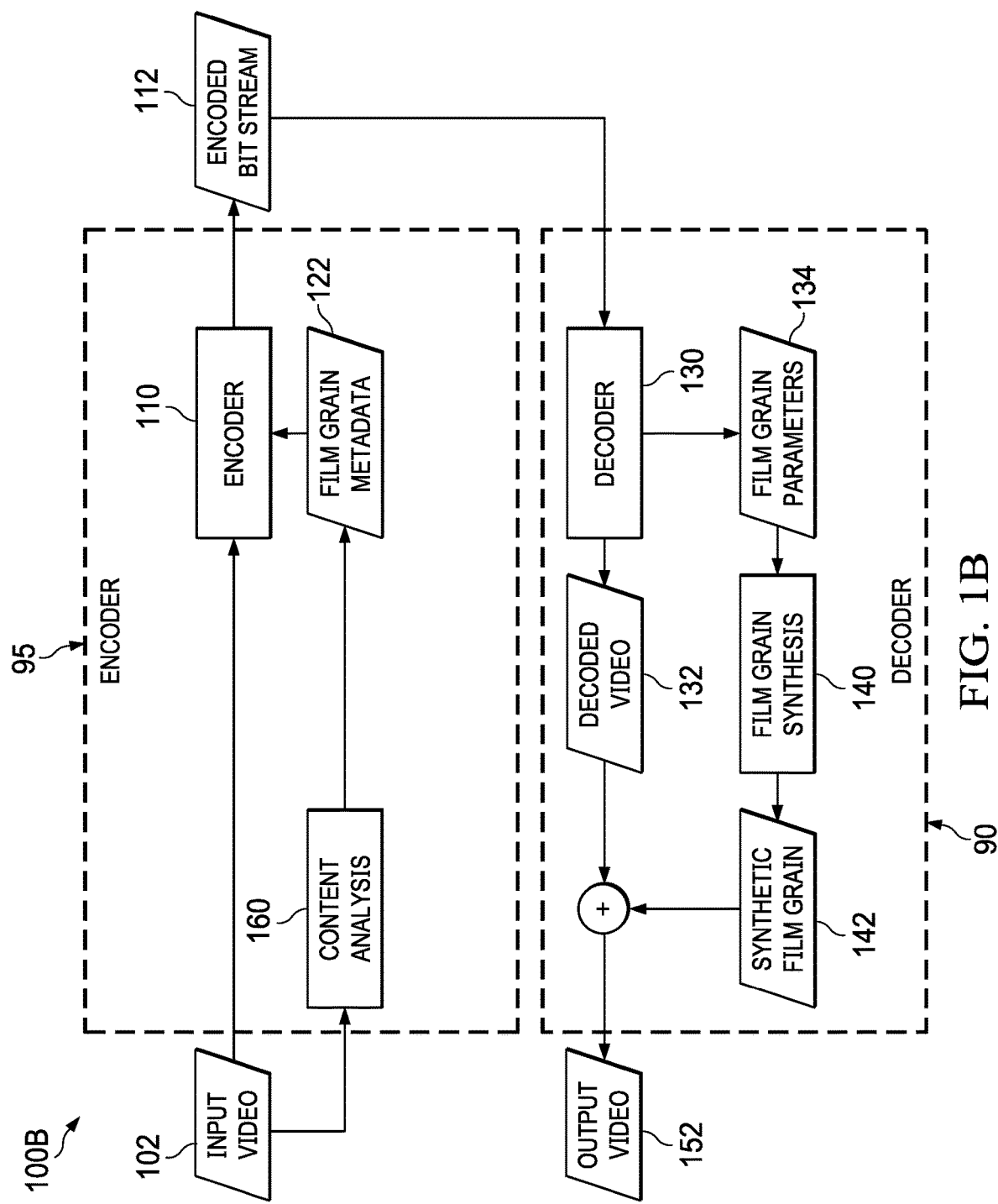
FIG. 1B depicts an example end-to-end flow of film grain technology when film grain may not be part of the original input video but is added in a decoder.

FIG. 1B depicts an example end-to-end flow (100B) of film grain technology when film grain may not be part of the original input video, but it may be added during the decoding process. As depicted in FIG. 1B, during encoding (95), given an input video sequence (102), which may be free of film grain, a content analysis step (160) may take into consideration the input characteristics and the encoder (110) coding characteristics to decide on what type of synthetic film-grain noise, when added on the decoded video, may improve video quality or emulate a "film look." The output of this analysis is a set of film-grain model parameters which can be embedded into the coding bitstream (112) as metadata (122). These metadata can be part of the bitstream syntax or part of supplemental information (e.g., SEI messaging and the like).

The decoding process (90) in process 100B is identical to the one as in process 100A. After decoding the coded bitstream (112), a film-grain synthesis process (140) applies the extracted FG parameters to generate synthetic film grain (142), which, when added to the decoded film-grain-free video (132) generates the output video 152, which is a close approximation of the input video (102).

A blending mode: comprising an additive mode or a multiplicative mode

Intensity intervals: comprising lower and upper bounds for each of the intervals Component model values: syntax parameters which define the characteristics of the method used in a particular grain model.

As an example, Table 1 captures some of the key parameters supported in FGC SEI for AVC. In VVC SEI (Ref. [6]), these parameters may be referred to with slightly different names, e.g., fg_model_id, fg_separate_colour_description_present_flag, fg_blending_mode_id, and the like.

TABLE 1

Film Grain Characteristic in MPEG SEI parameters

| Parameter | bits used | Range | Significance |
|---|---|---|---|
| film_grain_model_id | 2 | 0, 1 | Model to be used in grain synthesis. 0: Frequency filtering, 1: Auto-regression |
| separate_colour_description_present_flag | 1 | 0, 1 | Defines whether color description for the film grain specified is same as for the coded video sequence. |
| blending_mode_id | 2 | 0, 1 | Blending mode used to combine grain and decoded samples. 0: Additive, 1: Multiplicative |
| comp_model_present_flag | 1 | 0, 1 | Defines the presence of modelling of film grain on each color component |
| num_intensity_intervals_minus1 | 8 | 0-255 | Defines the number of intensity intervals for each color component |
| num_model_values_minus1 | 3 | 0-5 | Specifies the number of component model values available in the SEI (default values will be used for the remaining component model values) |
| intensity_interval_lower_bound | 8 | | Lower bound for each of intensity intervals for which the model is applicable |
| intensity_interval_upper_bound | 8 | | Upper bound for each of intensity intervals for which the model is applicable |
| comp_model_value | se(v) | Range_0 Range_1 | Component model values has different meaning depending on the value of film grain model used. |
| film_grain_characteristics_repetition_period | ue(v) | 0-16384 | Defines the persistence of the FGC SEI message in the bit stream. | where
Range_0: [0,limit_model_0] for film_grain_model_id=0;
Range_1: [−limit_model_1, limit_model_1 −1 ] for film_grain_model_id=1;
with limit_model_0 = $2^{(filmGrainBitDepth[ c ])} - 1$ and
limit_model_1 = $2^{(filmGrainBitDepth[ c ] - 1)}$.

Note:
for HEVC and VVC, film_grain_characteristics_repetition_period is replaced by fg_characteristics_persistence_flag which uses u(1) encoding (unsigned integer of 1 bit).

MPEG Film Grain Metadata

In AVC, HEVC, and VVC (Refs. [1-3] and Ref. [6]), collectively, for ease of discussion, to be referred to as MPEG or as MPEG video, the film grain model parameters are part of the syntax related to film grain characteristics (FGC) or film-grain (FG) SEI messaging. Film Grain Synthesis (FGS) is primarily characterized by the following set of parameters:

A film grain model: comprising a frequency filtering model or an auto-regression (AR) model In Table 1, the component values are used to specify the strength, shape, density, or other characteristics of the film grain. For example, for the frequency model (e.g., film_grain_model_id=0), the parameters in comp_model_value define the following film-grain parameters:

comp_model_value[0]: sigma ($\sigma$) (the standard deviation of a Gaussian noise generator).

comp_model_value[1]: horizontal high cutoff frequency ($c_{HF}^h$)

comp_model_value[2]: vertical high cutoff frequency ($c_{HF}^v$)

comp_model_value[3]: horizontal low cutoff frequency ($c_{LF}^h$)

comp_model_value[4]: vertical low cutoff frequency ($c_{LF}^v$)

Similarly, for the autoregressive (AR) model (e.g., when film_grain_model_id=1):

comp_model_value[0]: sigma ($\sigma$) (the standard deviation of a Gaussian noise generator)

comp_model_value[1]: first order correlation for neighboring samples (x−1, y) and (x, y−1)

comp_model_value[2]: correlation between consecutive color components comp_model_value[3]: first order correlation for neighboring samples (x−1, y−1) and (x+1, y−1)

comp_model_value[4]: aspect ratio of the modelled grain comp_model_value[5]: second order correlation for neighboring samples (x−2, y) and (x, y−2)

Synthesized grain, G[c][x][y], can be calculated for each color component, [c], at sample position, [x][y], as follows:

$$G[c][x][y] = \sigma * n[c][x][y] + a_{-1,0} * G[c][x-1][y] + a_{0,-1} * G[c][x][y-1] + $$
$$a_{-1,-1} * G[c][x-1][y-1] + a_{1,-1} * G[c][x+1][y-1]) + $$
$$a_{-2,0} * G[c][x-2][y] + a_{0,-2} * G[c][x][y-2] + b * G[c-1][x][y],$$

where n is a random value with normalized Gaussian distribution. The values of parameters $\sigma$, $a_{-1,0}$, $a_{0,-1}$, $a_{-1,-1}$, $a_{1,-1}$, $a_{-2,0}$, $a_{0,-2}$, and b are determined for each intensity interval from the corresponding model values signaled in the FGC SEI message.

Adding film grain may provide several benefits, including: providing a film-like look, increasing sharpness, alleviating of coding artifacts, and reducing banding artifacts. For film grain content, the colorist approves film grain look under reference viewing environment (e.g., Ref. [7]); however, a viewer's viewing environment can be quite different. It is widely recognized that the ambient viewing environment in which video content is experienced by the viewer can have a substantial effect on perceptual quality. For example, the viewing experiences of a video in a dark movie theater, a typical home (at night or during the daytime), or outdoors can be quite different. The viewing experience may also be impacted by the type of the targeted display, such as, TVs, mobile phones, tablets, laptop computers, an the like, and the viewer distance or view angle from the display.

Experimental studies by the inventors demonstrated that the perception of film grain changes when the viewing environment changes. The major impact factors include:

The ambient environment (e.g., dark or bright surroundings)

The display characteristics (e.g., screen size, resolution, display density, contrast, brightness, and the like)

The viewing distance (or view angle) of the viewer from the display

For example, in a typical film-grain modelling environment, the colourist may define film-grain parameters based on viewing the content in a dark room, at a normal viewing distance (say, 2× the screen height) and a reference HD display. In a decoder, depending on the viewing environment, the film grain synthesis may need to be adjusted. For example, when the room is dimly lit, for a shorter viewing distance, and a lower-resolution display, the film grain needs to be denser and smaller. On the other hand, when viewers are in a bright room, at a longer viewing distance, and they are using a high-resolution display, a larger film grain can provide a better user experience.

Another important factor is the number of viewers. For mobile phones or small resolution display cases, the multi-viewer use case most likely does not exist, but special attention should be paid in a group-viewing environment, say, in front of a TV in the living room. In this case, one may wish to disable changing film-grain synthesis parameters related to viewing distance (e.g., using only default values), and only allow to adjust the FG model parameters based on ambient light and display parameters.

In embodiments, film-grain model adaptations can be performed manually, through a user interface, or automatically, say, via sensors in the room or on the display device, or by using a combination of the two approaches. For example, a user may send viewing parameters to the decoder via a decoder interface or a mobile application and the like. Alternatively, ambient light and distance sensors (on the display or other devices) may capture such information automatically and feed it to the film-grain synthesis model.

Figure 2:
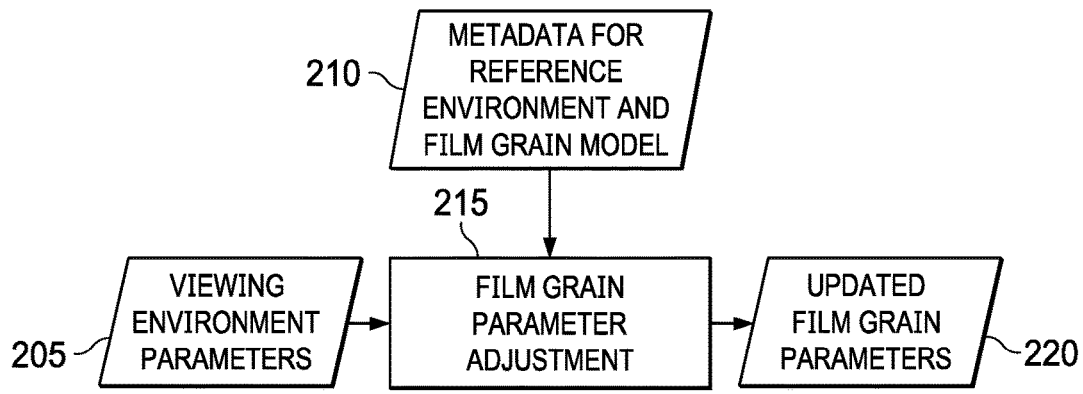
FIG. 2 depicts an example of a process flow to update film-grain metadata parameters based on a viewing environment according to an embodiment of this invention.

FIG. 2 depicts an example embodiment of film-grain parameter adaptation. As depicted in FIG. 2, given a coded bitstream, a receiver may also receive metadata (210) related to the reference environment and a film grain model. In addition, via sensors and/or user input, the receiver may also receive viewing environment parameters (205) (such as ambient light, viewing distance, and display parameters). Given these inputs, the receiver may apply film-grain model adjustment functions (215) to generate updated film-grain parameters (220) to be used for film-grain synthesis and blending.

Example embodiments for film-grain parameter adaptation include three alternative methods, to be described in further detail later on. In a first embodiment, for each frame, one signals a single FG model. This FG model may be associated with a reference viewing environment decided either by other (optional) SEI messages or can be based on a known standard, such as Ref. [7] or Ref. [8] and the like. If the display viewing environment is different from the reference one, a decoder (or a user) can apply the proposed adaptation method to adjust the FG model. In a second embodiment, a list of FG models (for a variety of viewing scenarios) may be signaled and the decoder (or user) can select the model which is closest to the actual viewing environment. In the third method, the FG models are categorized. For each category, one or more models may be specified. The decoder (or user) can choose the category classifications based on the viewing parameters and then apply interpolation to generate an FG model to have the best viewing experience.

To simplify the description, without loss of generality, example adaptation functions are described only for the following three viewing environment parameters: ambient light, display pixels/dots per inch (ppi or dpi), and viewing distance; however, the methodology can easily be extended to include other factors or parameters (such as: contrast of the display, brightness of the display, viewing angle, the display mode (e.g., vivid, film, normal), and the like). It is also noted that while examples use MPEG SEI messaging parameters, the proposed embodiments are not restricted to any specific FG models and are applicable to both existing models (e.g., as described by MPEG and AV1) and future FG models.

Single Film-Grain Reference Viewing Model

In MPEG, a film-grain SEI message may be used to communicate to the decoder the FG model parameters; however, such messaging does not include any information about the reference viewing environment. In MPEG, additional SEI messages may be used to describe parameters related to the viewing environment. As an example, one such SEI message is related to the "mastering display colour volume characteristics," as shown in Table 2. This SEI message identifies the color volume (the color primaries, white point, and luminance range) of a display considered to be the mastering display for the associated video content—e.g., the color volume of a display that was used for viewing while authoring the video content. As another example, a second SEI message is related to the "ambient viewing environment," as shown in Table 3. It identifies the characteristics of the nominal ambient viewing environment for the display of the associated video content.

TABLE 2

Mastering display colour volume SEI message syntax in VSEI

|  | Descriptor |
|---|---|
| mastering_display_colour_volume( payloadSize ) { |  |
|   for( c = 0; c < 3; c++ ) { |  |
|     mdcv_display_primaries_x[ c ] | u(16) |
|     mdcv_display_primaries_y[ c ] | u(16) |
|   } |  |
|   mdcv_white_point_x | u(16) |
|   mdcv_white_point_y | u(16) |
|   mdcv_max_display_mastering_luminance | u(32) |
|   mdcv_min_display_mastering_luminance | u(32) |
| } |  |

TABLE 3

Ambient viewing environment SEI message syntax in VSEI

|  | Descriptor |
|---|---|
| ambient_viewing_environment( payloadSize ) { |  |
|   ambient_illuminance | u(32) |
|   ambient_light_x | u(16) |
|   ambient_light_y | u(16) |
| } |  |

In a first embodiment, it is proposed to specify the reference viewing environment associated with the FGC SEI message and recommend methods on how to adjust the FG model parameters when the actual view environment differs from the reference viewing environment.

Consider, for simplicity and without loss of generality, three viewing parameters that need to be specified: the ppi of the display, the ambient light luminance, and the viewing distance. When the mastering display color volume SEI message is present, it specifies the display information for FGC SEI. When the ambient viewing environment SEI message is present, it specifies the ambient viewing environment. One could add metadata to indicate the proper viewing distance, or one can assume that the best practices are used, e.g., as those defined in Refs. [7, 8]. For example, for HD-resolution displays, the primary reference display should be positioned at a distance of approximately 3 to 3.2 times the picture height of the monitor from the viewer (Ref. [8]). For UHD resolution displays, the standards guidance suggests that the reference display should be positioned at a distance of 1.6 to 3.2 times the picture height (Ref. [7]). If no SEI messages exist related to the mastering environment, then one may assume best practices were applied according to the spatial resolution of the incoming pictures.

When the actual viewing environment is different from the reference viewing environment, the following practices are recommended to update the original FG model parameters:

The darker the room, the smaller and darker the grain should be. The brighter the room, the larger and brighter the grain can be The smaller the ppi (pixels per inch), the smaller the grain should be. The larger the ppi, the larger the grain can be The closer the viewing distance, the smaller the grain should be. The larger the viewing distance, the bigger the grain can be.

In an embodiment, one can have a functional model for each rule and then multiply the three functional models together to form the final FG model. For example, denote the reference ambient light measurement as $L^r$, the reference pixel per inch as $p^r$, and the reference viewing distance as $d^r$. Denote also as the corresponding measured values as $L^m$, $p^m$, and $d^m$. One can define the ratio between the reference and measured parameters as $$L = \frac{L^m}{L^r}, \qquad (1)$$

$$p = \frac{p^m}{p^r},$$

$$d = \frac{d^m}{d^r}.$$

Then, one can adjust the film grain parameters via some pre-defined functions. For example, for the frequency model parameters in the MPEG FG SEI model:

$$\sigma' = f_\sigma(\sigma, L, p, d), \qquad (2)$$

$$c_{HF}^{h\prime} = f_{HF}^h(c_{HF}^h, L, p, d),$$

$$c_{HF}^{v\prime} = f_{HF}^v(c_{HF}^h, L, p, d),$$

$$c_{LF}^{h\prime} = f_{LF}^h(c_{LF}^h, L, p, d),$$

$$c_{LF}^{v\prime} = f_{LF}^v(c_{LF}^v, L, r, d),$$

In an embodiment, examples of function models may include:

$$f(\sigma, L, p, d) = \sigma * (a_L + b_L * L) * (a_p + b_p * p) * (a_a + b_a * d), \qquad (3)$$

where, example values include: $a_L=1$, $b_L=0.01$, $a_p=1$, $b_p=0.5$, $a_d=1$, $b_d=2$, and $\sigma$ typically ranges in [1, 4], or $$f(\sigma, L, p, d) = \qquad (4)$$
$$\sigma * (a_L * \exp(b_L * L)) * (a_p * \exp(b_p * p)) * ((a_d * \exp(b_d * d)),$$

or $$f(\sigma, L, p, d) = \sigma * (a_L * \exp(b_L * L)) * (a_p + b_p * p) * (a_d + b_d * d). \qquad (5)$$

To make the noise stronger, the $\sigma$ value should increase. To increase the film grain size, the low and high cutoff frequency in both the horizontal and vertical direction should decrease so one includes fewer higher-frequency DCT coefficients. When the value for the cutoff frequency is an integer, one may apply rounding, as in $$f(\sigma, L, p, d) = clip3(round(f(\sigma, L, p, d)), 0, block_{size} - 1), \quad (6)$$

where $$clip3(x, a, b) = \begin{cases} a; & x < a \\ b; & x > b \\ x; & \text{otherwise} \end{cases}.$$

Other parameters, such as intensity_interval_lower_bound and intensity_interval_higher_bound, can be also adjusted via similar functional models.

For the AR model, the noise standard deviation, σ, can be adjusted in the same way as in the frequency filtering model. To enlarge the film grain, in an embodiment, one may increase the AR coefficients of the far-away pixels, such as $a_{-2,0}$ and $a_{0,-2}$, and decrease the coefficients of closer pixels smaller, such as $a_{-1,0}$ and $a_{0,-1}$. Coefficients $a_{-1,-1}$ and $a_{1,-1}$ may remain the same, or adjusted only slightly:

$$\sigma' = f_\sigma(\sigma, L, p, d), \quad (7)$$

$$a'_{-2,0} = f_{a_{-2,0}}(a_{-2,0}, L, p, d),$$

$$a'_{0,-2} = f_{a_{0,-2}}(a_{0,-2}, L, p, d),$$

$$a'_{-1,0} = f_{a_{-1,0}}(a_{-1,0}, L, p, d),$$

$$a'_{0,-1} = f_{a_{0,-1}}(a_{0,-1}, L, p, d),$$

$$a'_{-1,-1} = f_{a_{-1,-1}}(a_{-1,-1}, L, p, d),$$

$$a'_{1,-1} = f_{a_{1,-1}}(a_{1,-1}, L, p, d),$$

$$b' = f_b(b, L, p, d).$$

Note that the sum of the final coefficients should be equal to 1. Thus, the coefficients need to be normalized by m, the sum of all AR filter coefficients:

$$m = a'_{-2,0} + a'_{0,-2} + a'_{-1,0} + a'_{0,-1} + a'_{-1,-1} + a'_{1,-1} + b'.$$

Figure 3A:
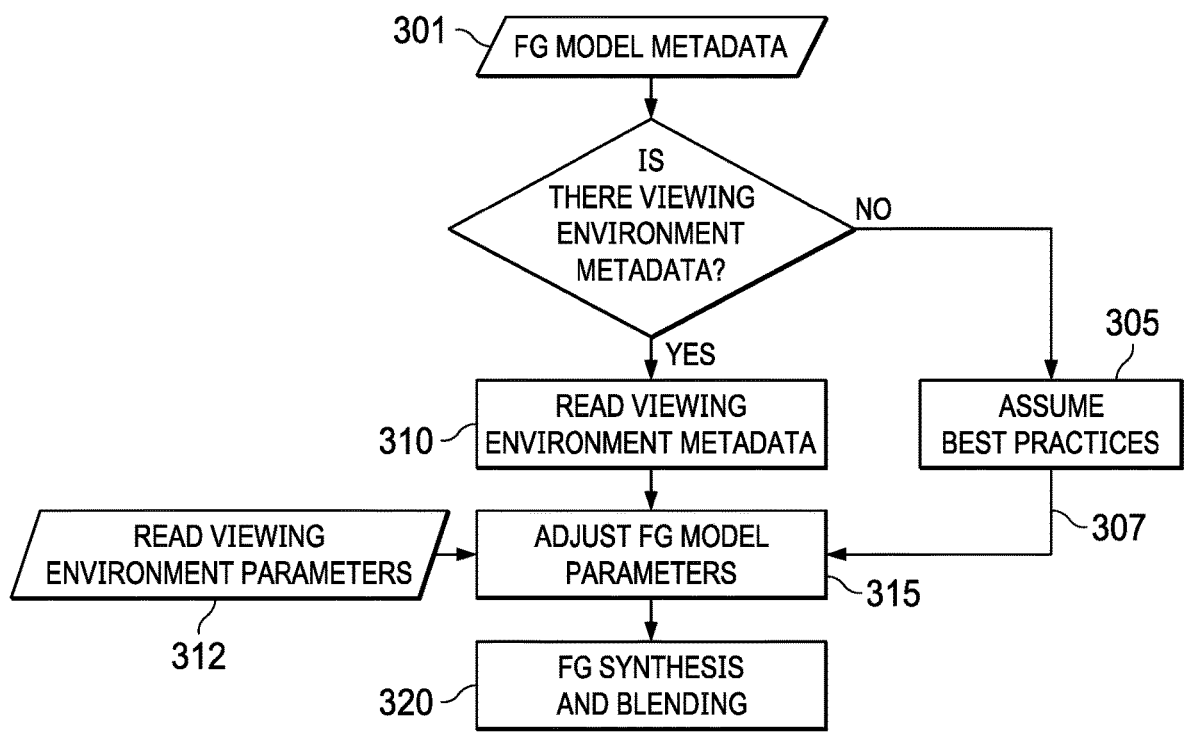
FIG. 3A, FIG. 3B, and FIG. 3C depict example process flows to update film-grain metadata parameters based on a viewing environment according to embodiments of this invention.

FIG. 3A depicts an example data process for film-grain parameter adaptation based on this adaptation method. As depicted in FIG. 3A, a receiver may receive film-grain related metadata (301) as part of a bitstream. The receiver may then search for additional metadata related to the preferred viewing environment. If such metadata is found, then the metadata is read in step 310, otherwise, the receiver may adopt best practices (305) or predefined default parameters to generate reference viewing parameters (307). Next, the receiver determines the actual viewing parameters (312) (say, via user input, sensors, and the like), and in step 315, it can adjust the input FG model parameters (301) according to the viewing environment (312) and the reference parameters (from input metadata or 307). Finally, in step 320, the adapted FG parameters are being used to generate synthetic film grain (or film noise) which is blended with the decoded bitstream data to be displayed on the target display.

Multiple Film-Grain Reference Viewing Models

In another embodiment, the bitstream can include multiple sets for film-grain-related metadata for a coded frame, where each FG model provides FG model parameters for a targeted viewing environment. Then, the decoder can select the model best suited for the viewer's environment.

Consider, for example, the MPEG SEI parameter set, as shown in Table 4 (Ref. [6]). Currently, Table 4 does not have any syntax elements to specify the viewing environment. To address that limitation, in an embodiment, one can re-interpret a parameter in the existing syntax to specify different viewing environments. In one example, for display information, one can reuse the syntax under fg_separate_colour_description_present_flag (see Table 4) to support providing target display information in a viewing environment. The benefit of this approach is that one can re-use the current FGC SEI syntax table and possibly also maintain backward compatibility. One way to maintain the backward compatibility is to always have an FGC SEI with fg_separate_colour_description_present_flag equal to 0. Then when fg_separate_colour_description_present_flag equal to 1, one can use the available bits to specify new parameters.

The related syntax of interest under fg_separate_colour_description_present_flag include:
- fg_colour_primaries is used to specify the colour primaries of the target display
- fg_transfer_characteristics is used to specify transfer characteristics of the target display. For example, it can be used to identify a target display as SDR or HDR (under PQ or HLG coding)

In an embodiment, the other four syntax parameters (fg_bit_depth_luma_minus8, fg_bit_depth_chroma_minus8, fg_full_range_flag and fg_matrix_coeffs) can be used to denote other viewing environment-related information. The first three syntax elements can provide 7 bits of information and the last syntax element can provide 8 bits of information. One can use those bits to provide other viewing environment parameters. For example, one can use the first 2 bits to signal the information related to the viewing distance to the display. One can use the subsequent 2 bits to signal the display density (ppi) information. Test results show that what matters most is the pixel distance to viewing distance ratio, thus, alternatively, one can use the first 4 bits to signal such a ratio directly. Then, one can use the next 3 bits to signal the maximum luminance for the target display. This in total will take 7 bits. One can use the last 8 bits to signal the ambient environment. An example is shown in Table 1, with new proposed syntax elements depicted in an Italic font.

TABLE 4

Film grain characteristics SEI message syntax in VSEI

| | Descriptor |
|---|---|
| film_grain_characteristics( payloadSize ) { | |
|   fg_characteristics_cancel_flag | u(1) |
|   if( !fg_characteristics_cancel_flag ) { | |

TABLE 4-continued

Film grain characteristics SEI message syntax in VSEI

| | Descriptor |
|---|---|
| fg_model_id | u(2) |
| fg_separate_colour_description_present_flag | u(1) |
| if( fg_separate_colour_description_present_flag ) { | |
|     fg_bit_depth_luma_minus8 | u(3) |
|     fg_bit_depth_chroma_minus8 | u(3) |
|     fg_full_range_flag | u(1) |
|     fg_colour_primaries | u(8) |
|     fg_transfer_characteristics | u(8) |
|     fg_matrix_coeffs | u(8) |
| } | |
| fg_blending_mode_id | u(2) |
| fg_log2_scale_factor | u(4) |
| for( c = 0; c < 3; c++ ) | |
|     fg_comp_model_present_flag[ c ] | u(1) |
| for( c = 0; c < 3; c++ ) | |
|     if( fg_comp_model_present_flag[ c ] ) { | |
|         fg_num_intensity_intervals_minus1[ c ] | u(8) |
|         fg_num_model_values_minus1[ c ] | u(3) |
|         for( i = 0; i <= fg_num_intensity_intervals_minus1[ c ]; i++ ) { | |
|             fg_intensity_interval_lower_bound[ c ][ i ] | u(8) |
|             fg_intensity_interval_upper_bound[ c ][ i ] | u(8) |
|             for( j = 0; j <= fg_num_model_values_minus1[ c ]; j++ ) | |
|                 fg_comp_model_value[ c ][ i ][ j ] | se(v) |
|         } | |
|     } | |
|     fg_characteristics_persistence_flag | u(1) |
| } | |
| } | |

TABLE 5

Example of FG view environment syntax

| | Descriptor |
|---|---|
| film_grain_characteristics( payloadSize ) { | |
|   fg_characteristics_cancel_flag | u(1) |
|   if( !fg_characteristics_cancel_flag ) { | |
|     fg_model_id | u(2) |
|     fg_separate_colour_description_present_flag | u(1) |
|     if( fg_separate_colour_description_present_flag ) { | |
|       *fg_pixel_view_distance_ratio_idc* | *u(4)* |
|       *fg_display_max_luminance_idc* | *u(3)* |
|       fg_colour_primaries | u(8) |
|       fg_transfer_characteristics | u(8) |
|       *fg_ambient_illuminance_idc* | *u(6)* |
|       *fg_ambient_chromaticity_idc* | *u(2)* |
|     } | |
| /*fg model parameters*/ | |
| ... | |
| } | | fg_pixel_view_distance_ratio_idc indicates the ratio of pixel distance (ppi: pixel per inch) over viewing distance in units of 20.

Note: As appreciated by the inventors, an important parameter for FG adaptation is the ppi to viewing distance ratio, i.e., the ratio of pixels per inch in the display over the viewing distance, which indicates how many pixels on screen the viewers can see.

fg_display_max_luminance_idc indicates the display maximum luminance. An example, via a table lookup, is specified in Table 6.

TABLE 6

Example of fg_display_max_luminance_idc mapping

| fg_display_max_luminance_idc | display max luminance information (nits) |
|---|---|
| 0 | 100 |
| 1 | 300 |
| 2 | 600 |
| 3 | 800 |
| 4 | 1000 |
| 5 | 2000 |
| 6 | 4000 |
| 7 | 10000 | fg_ambient_illuminance specifies the environmental illuminance of the ambient viewing environment in units of 7 lux.

Note: In an embodiment, it is desirable to cover ambient light levels from about 10 lux to about 400 lux. With the proposed precision, one can cover the range from 0 to 63*7=441 lux. One may adjust the syntax to cover alternative ranges.

fg_ambient_chromaticity_idc indicates the chromaticity of background for ambient viewing environment. An example of the mapping is shown in Table 7.

TABLE 7

Example of fg_ambient_chromaticity_idc mapping

| fg_ambient_chromaticity_idc | background chromaticity information |
|---|---|
| 0 | D65 |
| 1 | D93 |
| 2 | D50 |
| 3 | reserved |

In another embodiment, one may decide to add additional syntax elements to specify the viewing environment. Table 8 shows one example.

TABLE 8

Example of view_env_film_grain_characteristics SEI syntax table

| | Descriptor |
|---|---|
| view_env_film grain_characteristics( payloadSize ) { | |
|   fg_characteristics_cancel_flag | u(1) |
|   if( !fg_characteristics_cancel_flag ) { | |
|     ... | u(2) |
| // Start of new syntax | |
|     fg_view_environment_description_present_flag | u(1) |
|     if( fg_view_environment_description_present_flag ) { | |
|       /*target display information*/ | |
|       for( c = 0; c < 3; c++ ) { | |
|         fg_target_display_primaries_x[ c ] | u(16) |
|         fg_target_display_primaries_y[ c ] | u(16) |
|       } | |
|       fg_target_display_white_point_x | u(16) |
|       fg_target_display_white_point_y | u(16) |
|       fg_target_display_max_luminance | u(32) |
|       fg_target_display_min_luminance | u(32) |
|       fg_target_display_density /*in units of pixel per inch*/ | ue(v) |
|       /*ambient view environment*/ | |
|       fg_ambient_illuminance | u(32) |
|       fg_ambient_light_x | u(16) |
|       fg_ambient_light_y | u(16) |
|       /*viewing distance*/ | |
|       fg_view_distance | u(16) |
|     } | |
|   /*fg_model_parameters*/ | |
|   ... | |
| } | | fg_target_display_primaries_x[c], fg_target_display_primaries_y[c], fg_target_display_white_point_x, fg_target_display_white_point_y, fg_target_display_max_luminance, fg_target_display_min_luminance have the same semantics as specified in Mastering display colour volume SEI message.

fg_target_display_density specifies the number of physical pixels per inch (PPI) for the target display.

fg_ambient_illuminance, fg_ambient_light_x, fg_ambient_light_y have the same semantics as specified in the ambient viewing environment SEI message.

fg_view_distance specifies the distance from the viewer to display in the units of 0.001 feet.

In this adaptation scenario, the decoder needs to select which FGC SEI to pick among multiple sets based on its own viewing information. In one embodiment, assuming all of those viewing environment related parameters as a vector for scenario i is $m_i$, one can have K sets.

For the user's environment, m, one can generate the best setting $$i\_opt = \arg\min \| w^T(m - m_i) \|, \quad (8)$$

where w is the weighting factor vector to each FG parameter (see also equation (8)). The value of w can be trained based on experimental data or some other ways. In its simplest form, it can be the unit vector (e.g., $[1, 1, 1]^T$) for three FG parameters.

In another embodiment, one can just select the best model based on the most critical viewing environment parameters, such as room illuminance, display density to view distance ratio, and the like, next, one can select the closest value to the user environment.

In another embodiment, a decoder may have pre-stored a collection of film-grain models, each one for a distinct set of viewing parameters. In such a scenario, an encoder may simply signal to the decoder an index pointer to that set. For example, in Table 9, if fg_view_environment_description_present_flag==1, the viewing environment and corresponding FG model are signaled, otherwise, only an index fg_target_view_model_idx to the prestored models is signaled.

TABLE 9

Example of view_env_film grain_characteristics SEI syntax table with pointer to pre-stored FG models

| | Descriptor |
|---|---|
| view_env_film_grain_characteristics( payloadSize ) { | |
|   fg_characteristics_cancel_flag | u(1) |
|   if( !fg_characteristics_cancel_flag ) { | |
|     fg_view_environment_model_description_present_flag | u(1) |
|     if( fg_view_environment_model_description_present_flag ) | |
|       fg_target_environment_and_fg_model_parameters( ) | |
|     else | |

TABLE 9-continued

Example of view_env_film grain_characteristics SEI
syntax table with pointer to pre-stored FG models

| | Descriptor |
|---|---|
|     fg_target_view_model_idx | ue(v) |
|   } | |
| } | | fg_target_view_model_idx specifies an index to a predetermined set of film-grain models.

Figure 3B:
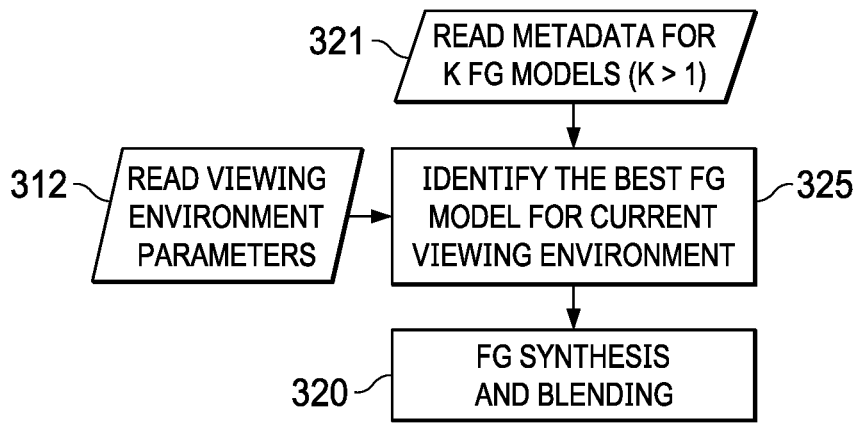

FIG. 3B depicts an example process for FG parameter adaptation according to embodiments of this method. Given input (transmitted or pre-stored) FG-related metadata (321) for K viewing environments, and parameters (312) related to the current environment, in step 325, the receiver identifies the best match among the K environments (e.g., i_opt), and in step 320 it applies the selected parameters for film-grain synthesis and blending.

Categorized Film-Grain Reference Viewing Models

In another embodiment, the FG models are categorized. For each category, one or more FG models may be specified with metadata. The user/decoder can choose the category and apply interpolation techniques to generate the FG model that fits best its actual viewing condition.

In an example embodiment, the category can be based on the room illuminance. Given a fixed room luminance value, one can signal the FG model for the two extreme pixel_view_distance_ratio cases. For any value between these two extreme pixel_view_distance_ratio values one can generate other values by a simple interpolation. For example, given boundary values A and B, parameters for A<x<B can be interpolated as:

$$z = \delta B + (1 - \delta)A, \quad (9)$$

where $$\delta = \frac{x - A}{B - A}.$$

Table 10 shows an example which signals the max and min pixel_view_distance_ratio value. The function fg_model_parameters( ) signals FG model parameters based on the value of pixel_view_distance_ratio. These model parameters can be any FG model, such as a frequency model, an autoregressive (AR) model in AVC/HEVC/VVC or AV1, or any other models. The model can be explicitly described using the variance/energy/brightness, shape, correlation parameters or described by some curves.

TABLE 10

Example of view_env_film_grain_characteristics SEI syntax table

| | Descriptor |
|---|---|
| view_env_film_grain_characteristics(fg_ambient_illuminance ) { | |
|   fg_max_pixel_view_distance_ratio | u(32) |
|   fg_model_parameters(fg_max_pixel_view_distance_ratio) | |
|   fg_min_pixel_view_distance_ratio | u(32) |
|   fg_model_parameters(fg_min_pixel_view_distance_ratio) | |
| } | | fg_max_pixel_view_distance_ratio specifies the maximum ratio of pixel distance (PPI: pixel per inch) over viewing distance in units of 0.000001.

fg_min_pixel_view_distance_ratio specifies the minimum ratio of pixel distance (PPI: pixel per inch) over viewing distance in units of 0.000001.

In another embodiment, the category can be based on both the room illuminance and the pixel_view_distance_ratio. Given a fixed room illuminance and pixel_view_distance_ratio, one may signal the model for several target display max luminance values. For given a display with max luminance value, one can interpolate the FG model between the models with the two closest max luminance value.

Table 11 shows an example which signals a set of target display maximum luminance values. The functions fg_model_parameters( ) signals FG model parameters based on the value of target display maximum luminance value. The model parameters can be any FG model, such as a frequency model, an AR model in AVC/HEVC/VVC or AV1, or any other models. The model can be explicitly described using the variance, shape, correlation parameters or described by some curves.

TABLE 11

Example of view_env_film_grain_characteristics SEI syntax table

| | Descriptor |
|---|---|
| view_env_film_grain_characteristics(fg_ambient_illuminance, fg_pixel_view_distance_ratio ) { | |
|   fg_num_target_display_minus1 | ue(v) |
|   for( i = 0; i < = fg_num_target_display_minus1; i++ ){ | |
|     fg_target_display_max_luminance[ i ] | u(32) |
|     fg_model_parameters(fg_target_display_max_luminance[ i ]) | |
| } | | fg_num_target_display_minus1 plus 1 specifies the number of target_display described in the FG model.
fg_target_display_max_luminance[i] specifies the ith target display max luminance. It has the same semantics as specified for the mdcv_max_display_mastering_luminance syntax element.

Example Weighted Combination of Film Grain Models

Consider receiving metadata that defines multiple reference viewing environments with film grain parameters. In an embodiment, for the k-th environment, consider reference values defined by: the ambient light measurement $L^{rk}$, the pixel per inch as $p^{rk}$, and the viewing distance as $d^{rk}$. Denote the corresponding measured parameters as: $L^m$, $p^m$, and $d^m$. If one considers all three parameters, one may compute a 3-D distance between the measured and reference parameters as:

$$D^k = \left(w_L(L^m - L^{rk})^2 + w_p(p^m - p^{rk})^2 + w_d(d^m - d^{rk})^2\right)^{0.5}, \quad (10)$$

where $w_L$, $w_p$, and $w_d$ are optional weighting factors to assign weighted importance for different measurement. For example, depending on the viewing environment, one may set some weights to 0 (e.g., $w_p=0$ and/or $w_d=0$), or all weights could be set to 1. The two nearest viewing environments can be found by finding the two ks with the smallest value, $D^k$. This can be easily done by sorting $\{D^k\}$ by ascending order and selecting the top two.

Without loss of generality, one may use the first and second viewing environments as the nearest viewing environment. Denote the first and second reference ambient light measurements as $L^{r1}$ and $L^{r2}$, the pixel per inch as $p^{r1}$ and $p^{r2}$, and the viewing distances as $d^{r1}$ and $d^{r2}$. Denote the corresponding measured parameters as $L^m$, $p^m$, and $d^m$. The film grain parameters from each associated environment are expressed as ($\sigma^1$, $c_{HF}^{h1}$, $c_{HF}^{v1}$, $c_{LF}^{h1}$, $c_{LF}^{v1}$) and ($\sigma^2$, $c_{HF}^{h2}$, $c_{HF}^{v2}$, $c_{LF}^{h2}$, $c_{LF}^{v2}$).

The distance between measured parameters and reference parameters are:

$$D^1 = \left(w_L(L^m - L^{r1})^2 + w_p(p^m - p^{r1})^2 + w_d(d^m - d^{r1})^2\right)^{0.5}, \quad (11)$$

$$D^2 = \left(w_L(L^m - L^{r2})^2 + w_p(p^m - p^{r2})^2 + w_d(d^m - d^{r2})^2\right)^{0.5},$$

One can adjust the film grain parameters via some predefined functions:

$$\sigma' = h_\sigma(\sigma^1, \sigma^2, L^{r1}, p^{r1}, d^{r1}, L^{r2}, p^{r2}, d^{r2}, L^m, p^m, d^m), \quad (12)$$

$$c_{HF}^{h\prime} = h_{hF}^h(c_{HF}^{h1}, c_{HF}^{h2}, L^{r1}, p^{r1}, d^{r1}, L^{r2}, p^{r2}, d^{r2}, L^m, p^m, d^m),$$

-continued $$c_{HF}^{v\prime} = h_{hF}^v(c_{HF}^{v1}, c_{HF}^{v2}, L^{r1}, p^{r1}, d^{r1}, L^{r2}, p^{r2}, d^{r2}, L^m, p^m, d^m),$$

$$c_{LF}^{h\prime} = h_{hF}^h(c_{LF}^{h1}, c_{LF}^{h2}, L^{r1}, p^{r1}, d^{r1}, L^{r2}, p^{r2}, d^{r2}, L^m, p^m, d^m),$$

$$c_{LF}^{v\prime} = h_{hF}^v(c_{LF}^{v1}, c_{LF}^{v2}, L^{r1}, p^{r1}, d^{r1}, L^{r2}, p^{r2}, d^{r2}, L^m, p^m, d^m).$$

For example, consider a model for $\sigma'$, then an example function is $$h_\sigma(\sigma^1, \sigma^2, L^{r1}, p^{r1}, d^{r1}, L^{r2}, p^{r2}, d^{r2}, L^m, p^m, d^m) = \quad (13)$$

$$\frac{D^2}{D^1 + D^2}\sigma^1 + \frac{D^1}{D^1 + D^2}\sigma^2.$$

When measured parameters ($L^m$, $p^m$, $d^m$) are identical to reference #1 ($L^{r1}$, $p^{r1}$, $d^{r1}$), $D^1=0$, thus, $\sigma'=\sigma^1$. Similarly, when the measurement parameters are identical to reference #2, $\sigma'=\sigma^2$. When the measurement are not identical to either reference, one may use the above weighted equation to computer $\sigma'$. The same method can be applied to compute the other four parameters in equation (12).

Figure 3C:
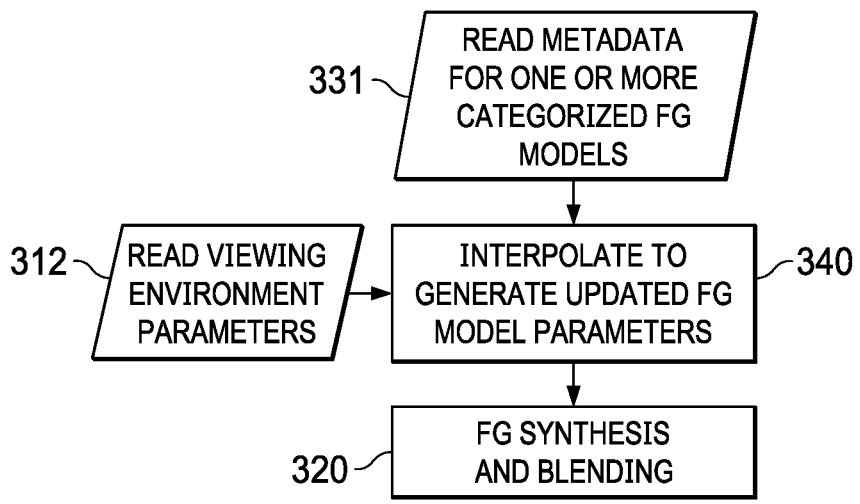

FIG. 3C depicts an example data flow for FG parameter adaptation according to embodiments of this method. The receiver accesses (via metadata or pre-stored) parameters for one more categorized FG models. Then, given parameters 312 of the viewing environment, in step 340, it applies interpolation techniques to generate the FG parameters that best match the viewing environment. Finally, in step 320, it applies the interpolated parameters to perform film-grain synthesis and blending.

A number of embodiments of the disclosure have been described. Nevertheless, it will be understood that various modifications may be made without departing from the spirit and scope of the present disclosure. Accordingly, the invention may be embodied in any of the forms described herein, including, but not limited to the following Enumerated Example Embodiments (EEEs) which described structure, features, and functionality of some portions of the present invention:

EEE 1. A method to process film grain metadata, the method comprising:
    receiving an input video bitstream and associated input film grain information;
    parsing the input film grain information to generate input film grain parameters (301) for generating film noise for a target display;
    accessing measured viewing parameters (312) for the target display;
    accessing reference viewing parameters for a reference display;

adjusting (315) one or more of the input film grain parameters based on the measured viewing parameters and the reference viewing parameters to generate adjusted film grain parameters;

generating output film noise based at least on the adjusted film grain parameters;

decoding the input video bitstream to generate decoded video pictures; and blending (320) the output film noise with the decoded video pictures to generate output video pictures on the target display.

EEE 2. The method of EEE 1, wherein the reference viewing parameters for the reference display are generated (310) by parsing metadata associated with the input video bitstream.

EEE 3. The method of EEE 1, wherein the reference viewing parameters for the reference display are generated based on predetermined values or values known by recommended practices in color grading.

EEE 4. The method of EEE 3, wherein the recommended practices in color grading include standards BT. 2035 or SMPTE 2080.

EEE 5. The method of any of EEEs 1-4, wherein the viewing parameters comprise an ambient light value, a pixels per inch value, and a viewing distance value.

EEE 6. The method of EEE 5, wherein adjusting the one or more of the input film grain parameters comprises:

generating ratio values between corresponding parameters in the measured and reference viewing parameters; and adjusting the one or more of the input film grain parameters based on the ratio values.

EEE 7. The method of EEE 6, wherein the adjusting comprises:

adjusting film grain size and/or strength proportionally to a ratio of measured ambient luminance over reference ambient luminance;

adjusting film grain size and/or strength proportionally to a ratio of measured viewing distance over reference viewing distance; and adjusting film grain size and/or strength proportionally to a ratio of measured pixels per inch over a reference pixels per inch.

EEE 8. The method of EEE 7, wherein an adjustment function of film grain noise comprises computing:

$$f(\sigma, L, p, d) = \sigma * (a_L + b_L * L) * (a_p + b_p * p) * (a_d + b_d * d),$$

where σ denotes noise standard deviation as determined in the input film grain parameters, L, p, and d denote the ratio values between corresponding parameters in the measured and reference viewing parameters for ambient luminance, pixels per inch, and viewing distance, and $a_L$, $b_L$, $a_p$, $b_p$, $a_d$, and $b_d$ denote film grain model adaptation constants.

EEE 9. A method to process film grain metadata, the method comprising:

receiving an input video bitstream and accessing two or more sets of associated input film grain information (321), each set corresponding to a distinct target viewing environment, and each set comprising film grain parameters for generating film noise for a target display;

accessing measured viewing parameters (312) for the target display;

based on the measured viewing parameters, selecting (325) from the two or more sets of input film grain information a selected set of input film grain information with parameters closest to the measured viewing parameters;

parsing the selected set of input film grain information to generate output film grain parameters for generating film noise for the target display;

generating output film noise based at least on the output film grain parameters;

decoding the input video bitstream to generate decoded video pictures; and blending (320) the output film noise with the decoded video pictures to generate output video pictures on the target display.

EEE 10. The method of EEE 9, wherein a viewing environment may be determined by parameters comprising one or more of:

an ambient light value in the viewing environment;

a viewing distance from a target display in the viewing environment;

a maximum luminance value of the target display;

pixels per inch in the target display;

a ratio of pixels per inch in the target display over the viewing distance from the target display;

an ambient chromaticity value in the viewing environment; and x and y color primaries for the target display.

EEE 11. The method of EEE 9 or EEE 10, wherein selecting the select set of input film grain information is based on minimized an error function between the measured viewing parameters and corresponding parameters in the two or more sets of input film grain information.

EEE 12. A method to process film grain metadata, the method comprising:

receiving an input video bitstream and accessing two or more sets of associated input film grain information (331), each set corresponding to a distinct target viewing environment, and each set comprising film grain parameters for generating film noise for a target display;

accessing measured viewing parameters (312) for the target display;

based on the measured viewing parameters, interpolating (325) parameters from the two or more sets of input film grain information to generate output film grain parameters;

generating output film noise based at least on the output film grain parameters;

decoding the input video bitstream to generate decoded video pictures; and blending (320) the output film noise with the decoded video pictures to generate output video pictures on the target display.

EEE 13. The method in EEE 12, wherein generating the output film grain parameters comprises:

based on the measured viewing parameters, selecting from the two or more sets of input film grain information a first set and a second set of input film grain information with parameters closest to the measured viewing parameters; and generating the output film grain parameters by applying an interpolation function based on corresponding parameters in the first set and the second set of the input film grain information.

EEE 14. The method of EEE 13, wherein the first set and the second set of the input film grain information are selected as the two sets from the two or more sets of input film grain information for which a distance measure between the measured viewing parameters and corresponding parameters in the two or more sets of input film grain information has the two smallest values of the distance measure.

EEE 15. The method of EEE 14, wherein computing the distance measure comprises:

$$D(i) = \left(\sum_{k=1}^{M} w_k \left(P(k)^m - P(k)^{r(i)}\right)^2\right)^{1/2},$$

wherein $w_k$, k=1, ..., M, denotes normalized weighting factors in [0, 1] for M viewing environment parameters (M>0), $P(k)^m$ denotes a measured value for the k-th viewing parameter, and $P(k)^{r(i)}$ denotes a corresponding viewing parameter value in the i-th film grain information set.

EEE 16. The method of EEE 15, wherein computing an interpolation function for the P-th film-grain parameter comprises computing:

$$f(P) = \frac{D2}{D1+D2} P(P_1) + \frac{D1}{D1+D2} P(P_2),$$

where D1 and D2 denote distortion values computed for the selected first set and the second set of the input film grain information, and $P(P_1)$ and $P(P_2)$ denote the values of the P-th film grain parameters defined in the first set and the second set of the input film grain information.

EEE 17. The method of any of EEEs 14-16, wherein the M viewing environment parameters comprise one or more of an ambient light value in the viewing environment;
a viewing distance from a target display in the viewing environment;
a maximum luminance value of the target display;
pixels per inch in the target display; and
a ratio of pixels per inch in the target display over the viewing distance from the target display.

EEE 18. The method of EEE 12, wherein there are only two received sets of input film grain information, one corresponding to a lower bound of an environment viewing parameter and one corresponding to an upper bound of the environment viewing parameter, wherein computing an interpolation function for the P-th film-grain parameter comprises computing $$f(P) = \delta * P(P_U) + (1-\delta) * P(P_L),$$

wherein $$\delta = \frac{P_m - P_L}{P_U - P_L},$$

where $P_m$ denotes a measured value of the environment viewing parameter between $P_L$ and $P_U$, $P_L$ and $P_U$ denote the lower and upper bounds of the environment viewing parameter, and $P(P_L)$ and $P(P_U)$ denote corresponding film grain parameters in the two received sets of input film grain information.

EEE 19. The method of any of EEEs 1-18, wherein the input film grain information comprises film grain supplemental enhancement information (SEI).

EEE 20. The method of any of EEEs 9-18, wherein the two or more sets of input film grain information are received via metadata together with the input video bitstream or they are prestored in a decoder to decode the input video bitstream.

EEE 21. The method of any of EEEs 9-18, wherein at least one of the two or more sets of input film grain information is prestored in a decoder to decode the input video bitstream and is identified via an index parameter in metadata in the input video bitstream.

EEE 22. A non-transitory computer-readable storage medium having stored thereon computer-executable instructions for executing with one or more processors a method in accordance with any one of the EEE s 1-21.

EEE 23. An apparatus comprising a processor and configured to perform any one of the methods recited in EEEs 1-21.

REFERENCES

Each one of the references listed herein is incorporated by reference in its entirety.

[1] *Advanced Video Coding*, Rec. ITU-T H.264, May 2019, ITU.
[2] *High Efficiency Video Coding*, Rec. ITU-T H.265, November 2019, ITU.
[3] *Versatile Video Coding*, Rec. ITU-T H.266, August 2020, ITU.
[4] *AV1 Bitstream and Decoding Process Specification*, by P. de Rivaz et al., Version 1.0.0 with Errata, 2019 Jan. 8.
[5] *RDD 5-2006-SMPTE Registered Disclosure Doc—Film Grain Technology—Specifications for H.264\MPEG-4 AVC Bitstreams*, March 2006, SMPTE.
[6] *Versatile supplemental enhancement information messages for coded video bitstreams*, Rec. ITU-T H.274, August 2020, ITU.
[7] *A reference viewing environment for evaluation of HDTV program material or completed programmes*. Rec. ITU-R BT.2035 (July 2013), ITU.
[8] SMPTE 2080-3:2017, *"Reference viewing environment for evaluation of HDTV images,"* SMPTE.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to film-grain parameter adaptation for a viewing environment, such as those described herein. The computer and/or IC may compute any of a variety of parameters or values that relate to film-grain parameter adaptation for a viewing environment described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder, or the like may implement methods related to film-grain parameter adaptation for a viewing environment as described above by executing software instructions in a program memory accessible to the processors. Embodiments of the invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted. Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to film-grain parameter adaptation for a viewing environment are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method to process film grain metadata, the method comprising:
receiving an input video bitstream and associated input film grain information;
parsing the input film grain information to generate input film grain parameters (301) for generating film noise for a target display;
accessing measured viewing parameters (312) for the target display, wherein the viewing parameters comprise an ambient light value, a pixels per inch value, and a viewing distance value;
accessing reference viewing parameters for a reference display;
adjusting (315) one or more of the input film grain parameters based on the measured viewing parameters and the reference viewing parameters to generate adjusted film grain parameters, wherein the adjusting comprises:
generating ratio values between corresponding parameters in the measured and reference viewing parameters;
adjusting film grain size and/or strength proportionally to a ratio of measured ambient luminance over reference ambient luminance;
adjusting film grain size and/or strength proportionally to a ratio of measured viewing distance over reference viewing distance; and
adjusting film grain size and/or strength proportionally to a ratio of measured pixels per inch over a reference pixels per inch;
generating output film noise based at least on the adjusted film grain parameters;
decoding the input video bitstream to generate decoded video pictures; and
blending (320) the output film noise with the decoded video pictures to generate output video pictures on the target display.

2. The method of claim 1, wherein the reference viewing parameters for the reference display are generated (310) by parsing metadata associated with the input video bitstream.

3. The method of claim 1, wherein the reference viewing parameters for the reference display are generated based on predetermined values or values recommended by standards BT. 2035 or SMPTE 2080.

4. The method of claim 1, wherein an adjustment function of film grain noise comprises computing:

$$f(\sigma, L, p, d) = \sigma * (a_L + b_L * L) * (a_p + b_p * p) * (a_d + b_d * d),$$

where $\sigma$ denotes noise standard deviation as determined in the input film grain parameters, L, p, and d denote the ratio values between corresponding parameters in the measured and reference viewing parameters for ambient luminance, pixels per inch, and viewing distance, and $a_L$, $b_L$, $a_p$, $b_p$, $a_d$, and $b_d$ denote film grain model adaptation constants.

5. A method to process film grain metadata, the method comprising:
receiving an input video bitstream and accessing two or more sets of associated input film grain information (331), each set corresponding to a distinct target viewing environment, and each set comprising film grain parameters for generating film noise for a target display;
accessing measured viewing parameters (312) for the target display;
based on the measured viewing parameters, interpolating (325) parameters from the two or more sets of input film grain information to generate output film grain parameters, wherein when there are only two received sets of input film grain information, one corresponding to a lower bound of an environment viewing parameter and one corresponding to an upper bound of the environment viewing parameter, then computing an interpolation function for the P-th film-grain parameter comprises computing $f(P)=\delta*P(P_U)+(1-\delta)*P(P_L),$ wherein $$\delta = \frac{P_m - P_L}{P_U - P_L},$$

where $P_m$ denotes a measured value of the environment viewing parameter between $P_L$ and $P_U$, $P_L$ and $P_U$ denote the lower and upper bounds of the environment viewing parameter, and $P(P_L)$ and $P(P_U)$ denote corresponding film grain parameters in the two received sets of input film grain information, generating output film noise based at least on the output film grain parameters;

decoding the input video bitstream to generate decoded video pictures; and blending (320) the output film noise with the decoded video pictures to generate output video pictures on the target display.

6. The method of claim 5, wherein generating the output film grain parameters comprises:

based on the measured viewing parameters, selecting from the two or more sets of input film grain information a first set and a second set of input film grain information with parameters closest to the measured viewing parameters; and generating the output film grain parameters by applying an interpolation function based on corresponding parameters in the first set and the second set of the input film grain information.

7. The method of claim 6, wherein the first set and the second set of the input film grain information are selected as the two sets from the two or more sets of input film grain information for which a distance measure between the measured viewing parameters and corresponding parameters in the two or more sets of input film grain information has the two smallest values of the distance measure.

8. The method of claim 7, wherein computing the distance measure comprises:

$$D(i) = \left( \sum_{k=1}^{M} w_k \left( P(k)^m - P(k)^{r(i)} \right)^2 \right)^{1/2},$$

wherein $w_k$, k=1, ..., M, denotes normalized weighting factors in [0, 1] for M viewing environment parameters (M>0), $P(k)^m$ denotes a measured value for the k-th viewing parameter, and $P(k)^{r(i)}$ denotes a corresponding viewing parameter value in the i-th film grain information set.

9. The method of claim 8, wherein computing an interpolation function for the P-th film-grain parameter comprises computing:

$$f(P) = \frac{D2}{D1 + D2} P(P_1) + \frac{D1}{D1 + D2} P(P_2),$$

where D1 and D2 denote distortion values computed for the selected first set and the second set of the input film grain information, and $P(P_1)$ and $P(P_2)$ denote the values of the P-th film grain parameters defined in the first set and the second set of the input film grain information.

10. The method of claim 7, wherein the M viewing environment parameters comprise one or more of an ambient light value in the viewing environment;

a viewing distance from a target display in the viewing environment;

a maximum luminance value of the target display;

pixels per inch in the target display; and a ratio of pixels per inch in the target display over the viewing distance from the target display.

11. A non-transitory computer-readable storage medium having stored thereon computer-executable instructions for executing with one or more processors a method in accordance with claim 1.

\* \* \* \* \*